(12) United States Patent
Häcker

(10) Patent No.: US 6,253,630 B1
(45) Date of Patent: Jul. 3, 2001

(54) DEVICE TO MEASURE THE ROTATIONAL POSITION OF A STEERING WHEEL

(75) Inventor: Berthold Häcker, Goldbach (DE)

(73) Assignee: Linde Aktiengesellschaft (DE)

( * ) Notice: Subject to any disclaimer, the term of this patent is extended or adjusted under 35 U.S.C. 154(b) by 0 days.

(21) Appl. No.: 09/291,357

(22) Filed: Apr. 14, 1999

(30) Foreign Application Priority Data

Apr. 15, 1998 (DE) .............................. 198 16 683

(51) Int. Cl.$^7$ ...................................... G01N 19/00
(52) U.S. Cl. ................................ 73/865.9; 73/118.1
(58) Field of Search ............................... 73/118.1, 865.9

(56) References Cited

U.S. PATENT DOCUMENTS

| 4,518,954 | * | 5/1985 | Seko et al. ................. | 340/576 |
| 5,027,648 | | 7/1991 | Filleau ........................ | 73/118.1 |
| 5,330,021 | | 7/1994 | Beer et al. .................. | 180/79.1 |

FOREIGN PATENT DOCUMENTS

| 2501521A1 | 7/1976 | (DE) | .................. | G01L/5/22 |
| 3907442A1 | 9/1990 | (DE) | .................. | G01B/7/30 |
| 4131533A1 | 3/1993 | (DE) | .................. | G01B/7/30 |
| WO9306435 | 4/1993 | (DE) | .................. | G01D/5/16 |
| 4142992A1 | 7/1993 | (DE) | .................. | B62D/5/04 |
| 4205421Al | 8/1993 | (DE) | .................. | G01B/7/02 |
| 68909331T2 | 2/1994 | (DE) | .................. | B62D/15/02 |
| 69301960T2 | 8/1996 | (DE) | .................. | G01D/5/16 |
| 19510717A1 | 9/1996 | (DE) | .................. | B62D/6/00 |
| 19631305 | 2/1997 | (DE) | .................. | B60R/16/02 |
| 0389669A1 | 10/1990 | (EP) | .................. | G01D/5/16 |
| 0660084 | 6/1995 | (EP) | .................. | G01D/6/165 |

OTHER PUBLICATIONS

Patent Abstracts of Japan, 63–47611, P–733, Jul. 21, 1998, vol. 12/No. 259.

* cited by examiner

*Primary Examiner*—Hezron Williams
*Assistant Examiner*—Nashmiya Fayyaz
(74) *Attorney, Agent, or Firm*—Webb Ziesenheim Logsdon Orkin & Hanson, P.C.

(57) ABSTRACT

A device is provided to detect the rotational position of a steering wheel. A rotating steering shaft connected to the steering wheel is coaxial with respect to a non-rotating steering column. On one surface of the steering column facing the steering shaft, there is an electrical resistance sheet that extends in the peripheral direction of the steering column. Fastened to the steering shaft are at least two wipers associated with the resistance sheet, such that at all times at least one wiper is in contact with the resistance sheet in a position defined by the rotational position of the steering shaft. Preferably, there are exactly three wipers that correspond to the same resistance sheet that are offset from one another by about 120 degrees.

14 Claims, 2 Drawing Sheets

DEVICE TO MEASURE THE ROTATIONAL POSITION OF A STEERING WHEEL

BACKGROUND OF THE INVENTION

1. Field of the Invention

This invention relates generally to a device to measure the rotational position of a steering wheel in which a rotating steering shaft connected to the steering wheel is coaxial with respect to a non-rotating steering column.

2. Description of the Currently Available Technology

On steering devices for work machines, in particular for industrial trucks, the trend is toward technical development in the direction of electrical steering. That means that there is an electrical connection between the steering wheel and the steered wheel of the truck, instead of a conventional mechanical or hydraulic connection. The rotational position of the steering wheel is measured by means of a suitable device that is connected to an electrical evaluation device. The evaluation device, as a function of the movement of the steering wheel, actuates an electric steering motor, by means of which the steering movement of the steered wheel is produced.

One of the determining factors in the operational safety and reliability of such an electric steering system is the reliable function of the device that detects and measures the rotational position of the steering wheel.

An object of the invention is to provide a simple device to measure the rotational position of the steering wheel, which device has a high degree of operational reliability and accuracy.

SUMMARY OF THE INVENTION

The invention teaches that on a surface of the steering column facing the steering shaft there is at least one electrical resistance sheet that extends in a peripheral direction of the steering column. At least two wipers associated with the resistance sheet are fastened to the steering shaft such that at all times at least one wiper is in contact with the resistance sheet at a point defined by the rotational position of the steering shaft. In an alternative embodiment, the invention also teaches that on a surface of the steering shaft facing the steering column, there is at least one electrical resistance sheet that extends in a peripheral direction of the steering shaft. Fastened to the steering column are at least two wipers associated with the resistance sheet such that at all times at least one wiper is in contact with the resistance sheet in a position defined by the rotational position of the steering shaft.

When the steering wheel is turned, at least one wiper moves along the resistance sheet. The resistance sheet and the wiper thus form a potentiometer. A constant voltage is applied between the two ends of the resistance sheet. A voltage value applied to the wiper is therefore directly a function of the rotational position of the steering wheel.

The wiper can be realized in the form of an electrical wiper contact, wherein there is an electrical connection between the wiper and the resistance sheet.

It is also possible, however, that the resistance sheet can be realized as part of a film potentiometer of the type known in the prior art. On a film potentiometer, a conductive contact film is located between the resistance sheet and the wiper and comes into contact with the resistance sheet exactly at the position under the wiper. In this arrangement, no electrical currents are conducted by the wipers, which is advantageous with regard to the location of the electrical connectors and the useful life of the device to detect the rotational position of the steering wheel.

In an additional advantageous configuration of the invention, the resistance sheet extends over a peripheral angle of less than 360 degrees, preferably less than about 260 degrees. To make it possible to determine the steering angle, the resistance sheet should extend over a peripheral angle of less than about 360 degrees. A resistance sheet from a conventional commercially available potentiometer can be used if the resistance sheet extends over a peripheral angle of approximately 250 degrees.

It is advantageous if there are exactly two wipers associated with the same resistance sheet that are offset from one another in the peripheral direction. As a result of the offset arrangement, the invention ensures that at least one wiper is always in contact with the resistance sheet. The two wipers are preferably offset from each other by about 180 degrees.

The advantage of a redundant signal generation can be achieved if there are at least three wipers associated with the same resistance sheet. When three wipers are used, an arrangement is possible in which at least two wipers are in contact with the resistance sheet at all times. These two wipers in contact with the resistance sheet always generate an unambiguous signal that reflects the rotational position of the steering wheel. It thereby becomes possible to immediately recognize erroneous measurements of the type that can occur, for example, if the device to measure the steering angle is damaged. The three wipers are appropriately offset from one another by about 120 degrees.

A redundant signal can also be generated if there are two resistance sheets that are at some distance from one another in the axial direction, with two wipers associated with each resistance sheet. At least one wiper is always in contact with each resistance sheet so that when there are two resistance sheets, two signals that are independent of each other and reflect the rotational position of the steering wheel can be generated.

The invention also provides an electrical evaluation device to determine the rotational position of the steering wheel. The evaluation device is operationally connected with the resistance sheet(s) and/or with the wipers. The evaluation device can be formed by an electronic control unit, for example, in which the rotational position of the steering wheel is converted into a steering angle for the steered wheel. An electric steering motor that produces the steering movement of the steered wheel is actuated as a function of the steering angle calculated.

It is particularly advantageous if the evaluation device comprises means to measure the full rotations of the steering wheel. With the system of resistance sheets on the steering column or on the steering shaft described above, it is not possible to generate a signal that unambiguously reflects a rotation of the steering wheel at an angle of more than 360 degrees. The number of full rotations of the steering wheel is instead counted by means of the evaluation device, so that even if the steering wheel is turned by more than 360 degrees, it is possible to have an unambiguous correspondence with the position of the steered wheel.

Additional advantages and details of the invention are explained in greater detail below with reference to the embodiment illustrated schematically in the accompanying figures wherein like references characters identify like parts throughout.

DESCRIPTION OF THE PREFERRED EMBODIMENTS

Figure 1:
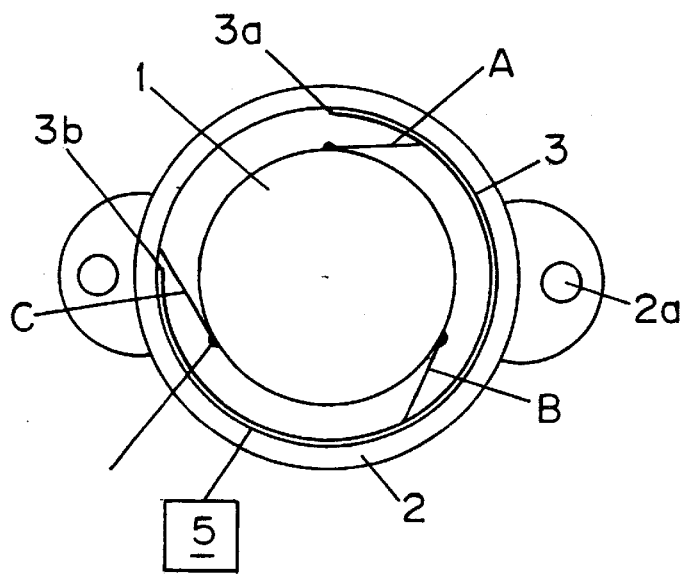
FIG. 1 is a cross section of a device of the invention.

FIG. 1 shows, in cross section, a device of the invention to measure the rotational position of a steering wheel on a vehicle. A steering shaft 1 that can rotate around its center axis, and to which a steering wheel (not shown) is coaxially fastened, is located inside a non-rotational steering column 2. The steering column 2 is fastened by means of lateral fastening lugs 2a to the frame of a vehicle.

On the inside of the steering column 2 there is a resistance sheet 3 which extends over a peripheral angle of approximately 250 degrees. A voltage is applied to the two ends 3a, 3b of the resistance sheet 3 in conventional manner, which voltage should be kept as constant as possible during the operation of the vehicle. Offset from one another at angles of about 120 degrees around the periphery of the steering shaft 1 are three wipers A, B, C, which are in contact with the resistance sheet 3 or with the inside of the steering column 2. This arrangement guarantees that at least two of the wipers A, B, C are in contact with the resistance sheet 3 at all times, and therefore there is an electrical connection between these wipers (for instance A and B) in FIG. 1 and the resistance sheet 3. Depending on the rotational position of the steering wheel, the wipers A, B, C tap defined voltages, analogous to the operation of a standard commercially available potentiometer. The rotational position of the steering wheel can be determined with precision on the basis of these voltages.

Figure 2:
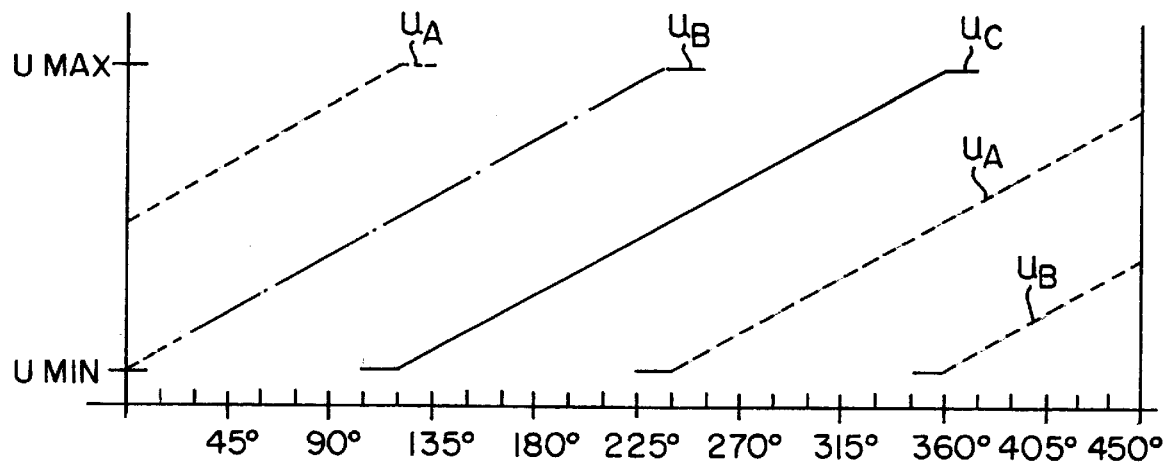
FIG. 2 is a graph of wiper voltage versus the rotational position of a steering wheel.

FIG. 2 shows the continuous curve of the voltages $U_A$, $U_B$, and $U_C$ at the wipers A, B and C, respectively, over the angle of rotation of the steering wheel. At each angular position, at least two voltages $U_A$, $U_B$ or $U_C$ can be tapped, so that there is a redundant signal. The voltage difference between the two tapped voltages is always independent of the angular position, a fact which can be used to detect erroneous measurements.

On account of the design of the system, after a steering angle of 360 degrees, the voltage curves measured at the three wipers A, B and C repeat. The number of rotations of the steering wheel is preferably therefore determined by a special device, for example a suitable counter or evaluation device 5 operationally connected to the resistance sheet 3 (as shown schematically in FIG. 1) or the wipers A, B, C.

Figure 3:
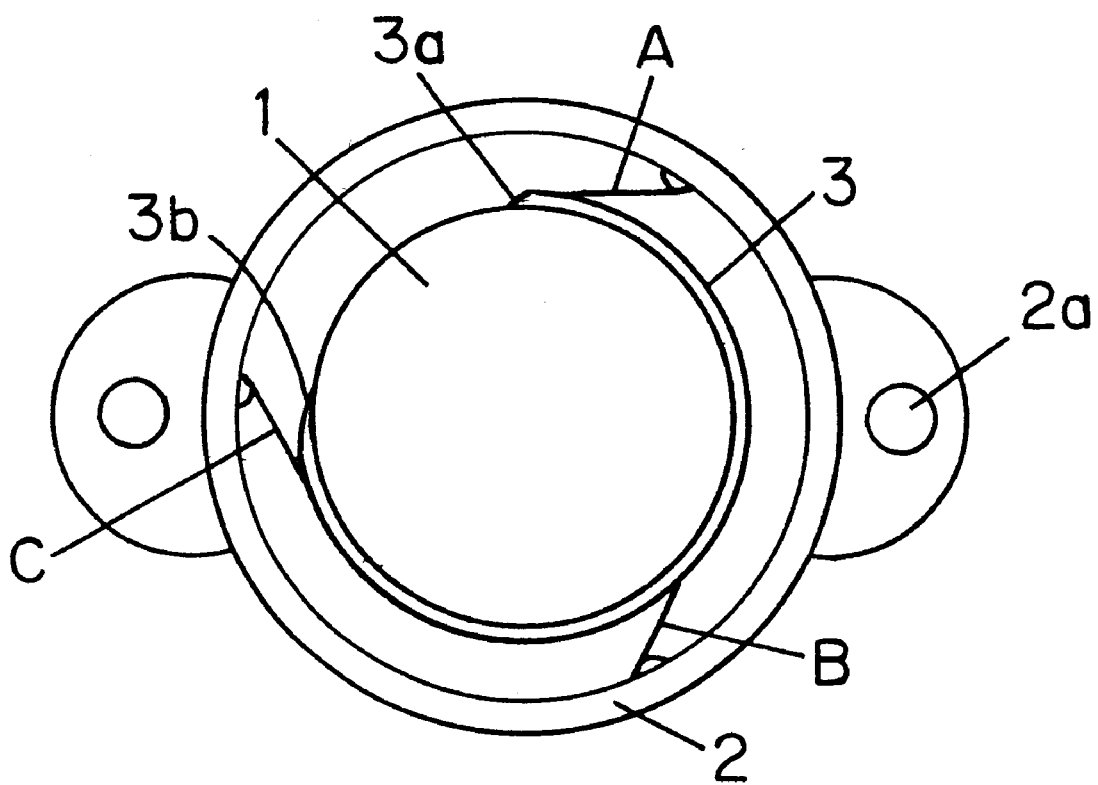
FIG. 3 is an alternative embodiment of the device shown in FIG. 1.

FIG. 3 shows an alternative embodiment of the device shown in FIG. 1 in which the resistance sheet 3 is located on the outer peripheral surface of the steering shaft 1 and the wipers A, B, C are attached to the inner peripheral surface of the steering column 2.

While the invention is described in detail herein, it will be appreciated by those skilled in the art that various modifications and alternatives to the arrangements can be developed in light of the overall teachings of the disclosure. Accordingly, the particular arrangements described above are illustrative only and are not limiting as to the scope of the invention, which is to be given the full breadth of the appended claims and any and all equivalents thereof.

What is claimed is:

1. A device to measure the rotational position of a steering wheel of a vehicle comprising:

a rotatable steering shaft connected to the steering wheel, wherein the steering shaft is substantially coaxial with respect to a non-rotatable steering column, wherein on a surface of the steering column facing the steering shaft there is at least one electrical resistance sheet that extends in a peripheral direction of the steering columns, wherein fastened to the steering shaft are at least three wipers that are offset from one another by about 120 degrees and are configured to contact the resistance sheet such that at all times at least two of the three wipers are in contact with the resistance sheet in a position defined by the rotational position of the steering shaft.

2. A device to measure the rotational position of a steering wheel of a vehicle, comprising:

a rotatable steering shaft connected to the steering wheel, wherein the steering shaft is substantially coaxial with respect to a non-rotatable steering column, wherein on a surface of the steering shaft facing the steering column there is at least one electrical resistance sheet that extends in a peripheral direction of the steering shaft, wherein fastened to the steering column are at least three wipers that are offset from one another by about 120 degrees and are configured to contact the resistance sheet such that at all times at least two of the three wipers are in contact with the resistance sheet in a position defined by the rotational position of the steering shaft.

3. The device as claimed in claim 1, wherein the wipers are realized in the form of an electrical wiper contact.

4. The device as claimed in claim 1, wherein the resistance sheet is realized in the form of part of a film potentiometer.

5. The device as claimed in claim 1, wherein the resistance sheet extends over a peripheral angle of less than about 360 degrees.

6. The device as claimed in claim 1, wherein the resistance sheet extends over an angle of less than about 260 degrees.

7. The device as claimed in claim 2, including an electrical evaluation device to determine the rotational position of the steering wheel, wherein the evaluation device is actively connected with at least one of the resistance sheet and the wipers.

8. The device as claimed in claim 7, wherein the evaluation device comprises means to measure full rotations of the steering wheel.

9. The device as claimed in claim 2, wherein the resistance sheet extends over an angle of less than about 260 degrees.

10. The device as claimed in claim 1, including an electrical evaluation device to determine the rotational position of the steering wheel, wherein the evaluation device is actively connected with at least one of the resistance sheet and the wipers.

11. The device as claimed in claim 10, wherein the evaluation device comprises means to measure full rotations of the steering wheel.

12. The device as claimed in claim 2, wherein the wipers are realized in the form of an electrical wiper contact.

13. The device as claimed in claim 2, wherein the resistance sheet is realized in the form of part of a film potentiometer.

14. The device as claimed in claim 2, wherein the resistance sheet extends over a peripheral angle of less than about 360 degrees.

* * * * *